M. L. WILLIAMS.
DETACHABLE VEHICLE RIM.
APPLICATION FILED FEB. 28, 1908.
969,930.
Patented Sept. 13, 1910.
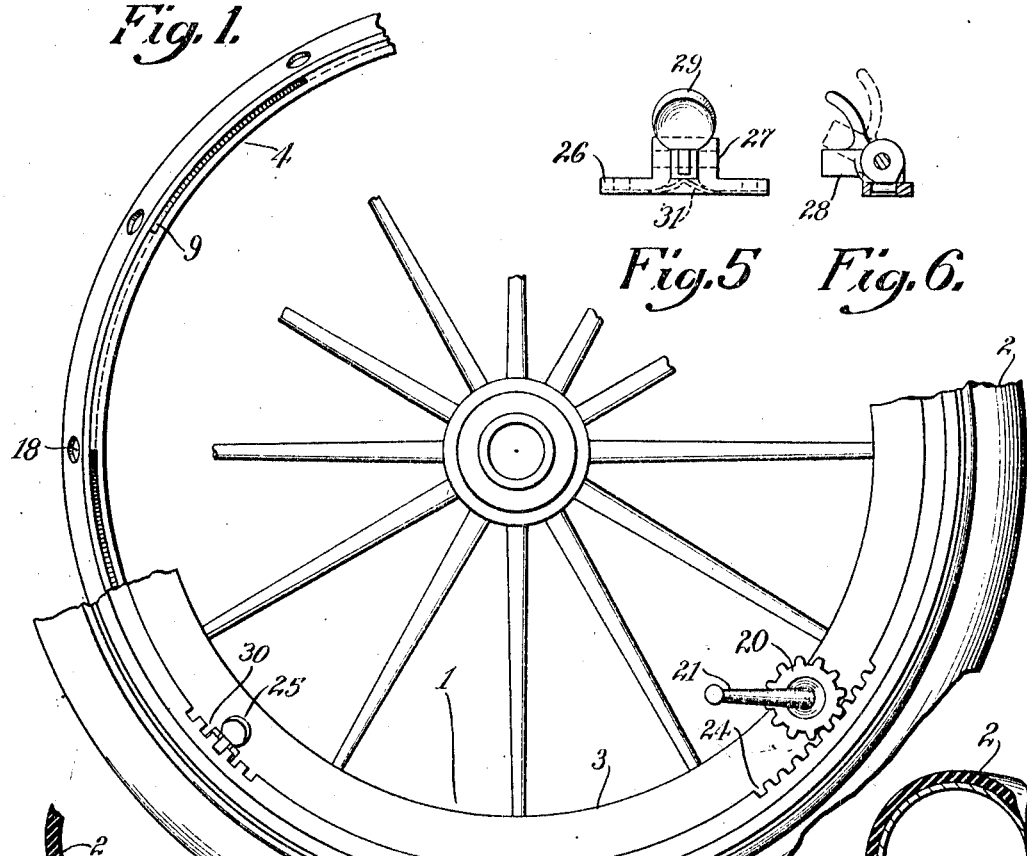
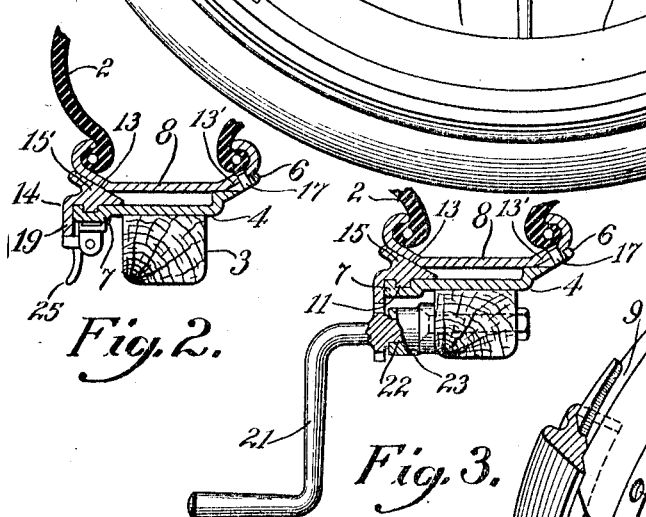
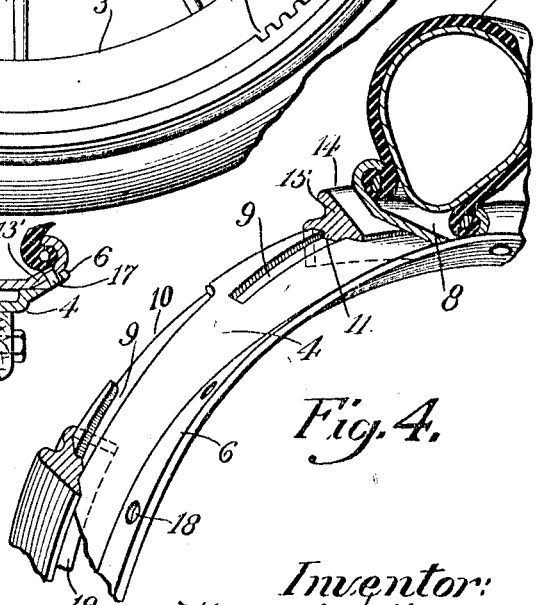
Witnesses:
Wm M Haenel
Lois Force
Inventor:
Martin L. Williams,
By Albert N. Graves
Attorney

UNITED STATES PATENT OFFICE.

MARTIN L. WILLIAMS, OF SOUTH BEND, INDIANA.

DETACHABLE VEHICLE-RIM.

969,930.

Specification of Letters Patent.

Patented Sept. 13, 1910.

Application filed February 28, 1908. Serial No. 418,180.

*To all whom it may concern:*

Be it known that I, MARTIN L. WILLIAMS, a citizen of the United States, residing at South Bend, in the county of St. Joseph and State of Indiana, have invented certain new and useful Improvements in Detachable Vehicle-Rims, and which refers more particularly to a rim adapted for use with inflated or pneumatic tires of various types.

As is well known automobiles or other motor vehicles generally carry an extra tire for use in case of injury, to any of those in use. In the case of a puncture or other injury, however, the injured tire must first be freed from the rim, the extra tire then placed upon the rim and then inflated. These various operations are usually tedious and accomplished under adverse conditions.

Among the salient objects of the invention are to obviate the above difficulties by providing a detachable rim adapted to be secured to the stationary rim proper and carrying an inflated tire ready for use.

Other objects of the invention are to provide a device which can be readily rearranged for use with various types of tires without necessitating material changes in the construction; to provide simple and reliable means for securing a detachable rim in place upon the wheel, consisting essentially of a detachable locking and rim supporting ring; to provide a construction whereby the locking ring may be forced into its assembled position by means of a simple detachable cranked gear; to provide an improved form of locking device for preventing circumferential movement of the locking ring upon the rim after the device is assembled; and in general to provide an improved construction of the character referred to.

The invention will be understood from the following description, reference being had to the accompanying drawings in which—

Figure 1 is a side elevation of the vehicle wheel embodying my invention, parts being broken away to show details of construction. Fig. 2 is a transverse sectional detail of my device in assembled position and adapted for use with the clencher type of tire. Fig. 3 is a view similar to Fig. 2 but showing the crank gear for forcing the locking ring into place upon the rim, the felly and part of the crank socket being shown in side elevation. Fig. 4 is a fragmentary perspective view of the parts in assembled position, part of the locking ring and detachable rim being cut away to show the coöperative relations of the various parts. Fig. 5 is a rear elevation of the locking device, the actuating spring being shown in dotted lines. Fig. 6 is a view similar to Fig. 5 taken at right angles thereto.

Referring to the drawings 1 designates as a whole the vehicle wheel provided with a pneumatic tire 2, the latter being in the present instance of the well known clencher type.

Upon the felly 3 is rigidly supported an inner rim 4 which is provided at one side with an elevated annular and inclined seat 6 adapted to support one side of the detachable rim 8, as will hereinafter appear. The other edge of the inner rim 4 is provided with a thickened portion 7 and in this thickened part of the rim are cut a series of bayonet slots 9. These slots extend circumferentially of the rim, are inclined obliquely inwardly from said edge and have relatively long entrance portions 10.

In order that the tire may be inflated before assembling, I provide a detachable rim 8, which together with its inflated tire may be carried on the vehicle in the same manner as the usual extra tire. In the present instance the detachable rim is shown as adapted for use with the clencher type of tires but obviously other types of tires may be used. This detachable rim 8 is adapted to fit upon and be supported by the inner rim and is accordingly inclined upwardly near its outer edges to form annular inclined seat faces 13'. When the outer rim 8 is assembled on the wheel, these seat faces are supported by the elevated extension 6 of the stationary rim and a similarly inclined portion of a locking ring 14 hereinafter described. In order to prevent circumferential movement of the outer rim relatively to the inner one, the outer edge of the elevated seat surface 6 of the seat face 13' is provided with one or more studs 17 which register with apertures 18 formed in the elevated support 6.

Describing now the means for locking the outer rim and tire upon the inner rim, 14 designates as a whole an endless locking ring which is adapted to wedge the outer rim into place and at the same time serves as a support for one side of the latter. This ring comprises a wedge shaped main body portion 15 the radially outer side of which is inclined inwardly to form a seat surface, an inturned annular flange 19, and a series of circumferentially extending bayonet lugs 11, formed on the inner periphery of the ring. These lugs or ribs 11 extend obliquely inwardly from the outer edge of the ring and are of such length and so disposed as to readily enter the corresponding bayonet slots upon the inner rim when the device is assembled. The tire and rim having been placed in position upon the wheel, the locking ring is slipped over the edge of the inner rim and the bayonet lugs entered in the entrances 10 of the bayonet slots 9, and the locking ring then rotated into locked position. Inasmuch as these bayonet slots are inclined inwardly from the outer edge of the inner rim, the ring will as it is turned into position have an axial as well as a circumferential movement. This axial movement will force the wedge shaped seat portion 15 of the locking ring between the two rims and thus effectually wedge the outer rim into place and prevent any lateral movement of the tire and outer rim independently of the wheel proper. As one feature of my invention, means are provided for thus forcing the locking ring into place upon the inner rim. To this end I provide a detachable crank-gear 20 rigid with a crank arm 21, which is adapted to be detachably journaled in a socket 22 formed in a stud extension 23 fixed to the felly of the wheel. The teeth of the gear mesh with a series of teeth 24 formed upon the inner edge of the inturned flange 19 of the locking ring. As the crank arm 21 is rotated, gear 20 meshing with the teeth on the flange 19 of the locking ring obviously turns the locking ring upon the inner rim until the ribs 9 have sufficiently entered their respective bayonet slots. After the locking ring is forced into place, the crank arm may be slipped out of the socket and stored away in the vehicle.

In order to obviate any danger of the locking ring slipping circumferentially upon the inner rim after the device is assembled, I provide a locking device designated as a whole 25 which is secured to the stationary rim 4. This locking device comprises a base plate 26 secured to the inner rim, and provided with a pair of upstanding ears 27 between which is pivotally mounted a spring pressed locking lever 28. One end of this lever is provided with a handle 29 while the other end is adapted to register with one of a series of recesses 30 formed on the lower edge of the annular flange 19 of the locking ring. The lever is held in its locked position by means of a plate spring 31 seated between the ears 27.

While I have herein shown and described a preferred embodiment of my invention it is obvious that the exact details of construction are not essential in the broader aspects of the invention.

I claim as my invention:

1. In a vehicle wheel, the combination with an inner rim having an inclined bearing surface at one side thereof, a detachable outer rim supported at one side by said bearing surface, a wedge shaped locking ring having an inclined bearing surface supporting the other side of said outer rim, a downturned flange upon the outer edge of said locking ring, bayonet joint connections between the outer periphery of said inner rim and the opposed periphery of said locking ring comprising a plurality of spaced apart lugs upon the inner face of said locking ring, and coöperating recesses or slots upon the upper face of the stationary rim, said slots being open at one end to permit the entrance of said lugs, and means coöperating with the downturned flange of said locking ring to force the latter into position upon the inner rim.

2. In a vehicle wheel, the combination with an inner rim having an inclined bearing surface at one side thereof, a detachable outer rim supported at one side by said bearing surface, a wedge shaped locking ring having an inclined bearing surface supporting the other side of said outer rim, a downturned flange upon the outer edge of said locking ring, bayonet joint connections between the outer periphery of said inner rim and the opposed periphery of said locking ring comprising a plurality of spaced apart lugs upon the inner face of said locking ring, and coöperating recesses or slots upon the upper face of the stationary rim, said slots being open at one end to permit the entrance of said lugs, and a cranked-gear detachably journaled in the felly of the wheel, and coöperating with the downturned flange of said locking ring to force the latter into position upon the inner rim.

MARTIN L. WILLIAMS.

Witnesses:
BERTHA ESHELMAN,
J. R. AUSTIN.